US010407753B2

(12) United States Patent
Chaiko et al.

(10) Patent No.: US 10,407,753 B2
(45) Date of Patent: Sep. 10, 2019

(54) METHODS FOR RAPIDLY LEACHING CHALCOPYRITE

(71) Applicants: FLSmidth A/S, Valby (DK); David J. Chaiko, South Jordan, UT (US)

(72) Inventors: David J. Chaiko, South Jordan, UT (US); Sara (Sally) Rocks, Sandy, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 15/535,000

(22) PCT Filed: Dec. 21, 2015

(86) PCT No.: PCT/US2015/067188
§ 371 (c)(1),
(2) Date: Jun. 9, 2017

(87) PCT Pub. No.: WO2016/100981
PCT Pub. Date: Jun. 23, 2016

(65) Prior Publication Data
US 2017/0369968 A1    Dec. 28, 2017

Related U.S. Application Data

(60) Provisional application No. 62/094,895, filed on Dec. 19, 2014, provisional application No. 62/101,932, filed on Jan. 9, 2015, provisional application No. 62/141,741, filed on Apr. 1, 2015, provisional application No. 62/156,165, filed on May 1, 2015, provisional application No. 62/195,204, filed on Jul. 21, 2015.

(51) Int. Cl.
| C22B 15/00 | (2006.01) |
| C22B 3/04  | (2006.01) |
| C01G 1/12  | (2006.01) |
| C01G 3/10  | (2006.01) |
| C01G 49/14 | (2006.01) |
| C22B 3/08  | (2006.01) |
| C22B 4/04  | (2006.01) |

(52) U.S. Cl.
CPC ............ *C22B 15/0071* (2013.01); *C01G 1/12* (2013.01); *C01G 3/10* (2013.01); *C01G 49/14* (2013.01); *C22B 3/04* (2013.01); *C22B 3/08* (2013.01); *C22B 4/04* (2013.01); *C22B 15/00* (2013.01); *C22B 15/001* (2013.01); *Y02P 10/234* (2015.11); *Y02P 10/236* (2015.11)

(58) Field of Classification Search
CPC ..... C22B 15/0071; C22B 15/001; C22B 4/04; C22B 3/08; C01G 1/12; C01G 49/14; C01G 3/10
USPC ................................ 423/27, 150.1
See application file for complete search history.

(56) References Cited

U.S. PATENT DOCUMENTS

| 2,568,963 | A |   | 9/1951  | McGauley, et al. |
| 2,662,009 | A | * | 12/1953 | Roberts ............... C22B 3/44 423/101 |
| 3,309,029 | A | * | 3/1967  | Frame ................. B03D 1/06 209/166 |
| 3,657,081 | A | * | 4/1972  | Holmes ............... C22B 30/02 205/563 |
| 3,816,105 | A | * | 6/1974  | McKay ............... C22B 15/0063 75/718 |
| 3,891,522 | A | * | 6/1975  | McKay ............... C22B 15/0071 205/584 |
| 3,957,602 | A |   | 5/1976  | Johnson et al. |
| 3,964,901 | A |   | 6/1976  | Swinkels et al. |
| 4,024,218 | A | * | 5/1977  | McKay ................ B03B 1/02 423/101 |
| 4,256,553 | A | * | 3/1981  | Baczek ............... C22B 15/0071 204/277 |
| 4,341,742 | A |   | 7/1982  | Clark et al. |
| 4,401,630 | A | * | 8/1983  | Ettell ................. C22B 23/0492 423/144 |
| 4,671,945 | A |   | 6/1987  | Thomassen |
| 4,758,344 | A | * | 7/1988  | Wildenauer ........... B03B 9/06 210/603 |
| 6,428,604 | B1 | * | 8/2002  | Kerfoot .............. C22L 33/06 205/370 |

(Continued)

FOREIGN PATENT DOCUMENTS

| AU | 2000-48867 | * 10/2000 |
| CA | 1258181    | *  8/1989 |

(Continued)

OTHER PUBLICATIONS

Gerlach et al, "Activation and leaching of chalcopyrite . . . " Int. Symp. on Hydromet., Mar. 1973, pp. 403-416. (Year: 1973).*
Elliot et al, "Chalcopyrite formation through the metathesis . . . " Geiochimica et Cosmochimica Acta, 75 (2011) pp. 2103-2118. (Year: 2011).*
Nowak, P. "Exchange current density . . . sulfide minerals to oxidation" Fizykochemiczne Problemy Mineralurgii, 27, pp. 37-43. (Year: 1993).*
Gerlach et al, "Activation and leaching of chalcopyrite concentrates with dilute sulfuric acid" International Symposium on Hydrometallurgy, 1973, pp. 403-416. (Year: 1973).*

(Continued)

*Primary Examiner* — Steven J Bos
(74) *Attorney, Agent, or Firm* — Jeffrey A. Sharp (57) ABSTRACT

A method of improving leach kinetics and recovery during atmospheric or above-atmospheric leaching of a metal sulfide is disclosed. A system for practicing the aforementioned method is also disclosed. Apparatus for practicing the aforementioned method is also disclosed. A new composition of matter which is formed by the aforementioned method, and which may be utilized in the system and apparatus is further disclosed. The new composition of matter may exhibit improved leach kinetics, and may have some utility in the semi-conductor arts, including uses within photovoltaic materials.

20 Claims, 4 Drawing Sheets

(56) References Cited

U.S. PATENT DOCUMENTS

| | | | | |
|---|---|---|---|---|
| 9,422,610 B2* | 8/2016 | Chaiko | ............... | C22L 33/08 |
| 2008/0173132 A1* | 7/2008 | Dunn | ............... | C22B 15/0008 |
| | | | | 75/399 |
| 2009/0051262 A1* | 2/2009 | Minamoto | ........... | C09K 11/641 |
| | | | | 313/483 |
| 2009/0173188 A1* | 7/2009 | Muller | ............... | C22B 3/045 |
| | | | | 75/743 |
| 2017/0283908 A1* | 10/2017 | Chaiko | ............... | C22L 33/02 |
| 2017/0356063 A1* | 12/2017 | Chaiko | ............... | C22L 33/04 |

FOREIGN PATENT DOCUMENTS

| | | | |
|---|---|---|---|
| WO | 03/038137 | * | 5/2003 |
| WO | 2004106561 A1 | | 12/2004 |
| WO | 2014/074985 | * | 5/2014 |
| WO | 2014/138808 | * | 9/2014 |

OTHER PUBLICATIONS

Avraamides et al, "Cuprous hydrometallurgy Part VI activation of chalcopyrite by reduction with copper and solutions of copper(I) salts" Hydrometallurgy, 5, pp. 325-336. (Year: 1980).*
Positive International Preliminary Report on Patentability dated from US R/O dated May 16, 2017.

* cited by examiner

METHODS FOR RAPIDLY LEACHING CHALCOPYRITE

CROSS-REFERENCE TO RELATED APPLICATIONS

This is a U.S. § 371 National Stage entry application of international application PCT/US2015/067188 filed on 21 Dec. 2015 which claims priority to, and the benefit of, the following applications: U.S. Provisional Patent Application No. 62/094,895, filed on 19 Dec. 2014, which is titled: "METHODS FOR RAPIDLY LEACHING CHALCOPYRITE"; U.S. Provisional Patent Application No. 62/101,932, filed on 9 Jan. 2015, which is titled: "ACTIVATED CHALCOPYRITE NANOCOMPOSITE COMPOSITIONS HAVING INCREASED ELECTROCHEMICAL REACTIVITY AND ASSOCIATED METHODS THEREOF"; U.S. Provisional Patent Application No. 62/141,741, filed on 1 Apr. 2015, which is titled: "ACTIVATED CHALCOPYRITE NANOCOMPOSITE COMPOSITIONS HAVING INCREASED ELECTROCHEMICAL REACTIVITY AND ASSOCIATED METHODS THEREOF"; U.S. Provisional Patent Application No. 62/156,165, filed on 1 May 2015, which is titled: "RAPID OXIDATIVE LEACH PROCESS AND APPARATUS THEREOF"; and U.S. Provisional Patent Application No. 62/195,204, filed on 21 Jul. 2015, which is titled: "RAPID OXIDATIVE LEACH PROCESS USING MECHANO-CHEMICAL PROCESSING AND CHEMICAL ACTIVATION FOR TREATING CHALCOPYRITE". This application further relates to the following applications: co-pending International Patent Application No. PCT/US2015/066003, filed on 16 Dec. 2015, PCT/US2015/050045 filed on 14 Sep. 2015, PCT/US2015/061761 filed on 20 Nov. 2014, and PCT/US2015/062000 filed on 20 Nov. 2014. The contents of all aforementioned applications are hereby incorporated by reference in their entirety, for any and all purposes as if fully set forth herein.

FIELD OF THE INVENTION

Embodiments of the invention relate to equipment and processes for improving metal value extraction from metal sulfide ores. According to some embodiments, the processes may include oxidative-only leaching. According to some embodiments, the processes may include a reductive pre-treatment of a metal sulfide prior to oxidative leaching (i.e., under reducing conditions) to form a unique composition with enhanced electrochemical reactivity.

BACKGROUND OF THE INVENTION

The processing and purification of metal sulfide containing ores involves various unit operations, including, without limitations, pre-leach crushing, pre-leach grinding, and pre-leach froth flotation. In the pre-leach froth flotation process, surface-active reagents are used to selectively alter the wetting characteristics of sulfide mineral surfaces to promote their separation from gangue minerals. The surfactant-modified particles are separated and recovered by virtue of their selective partitioning from the mineral slurry to a collected froth. Various types of froth flotation reagents are commonly used in mineral separations, including collectors, frothers, activators and depressants. When the mineral-containing pulp is aerated, the surface-modified particles have a tendency to attach to the air bubbles, and rise by buoyancy to produce a mineralized froth which is concentrated atop the surface of the agitated, mineral pulp. This froth is collected as a concentrate which is then oxidatively-leached.

In the hydrometallurgical processing of copper sulfide concentrates, copper concentrate is typically dispersed in an acidic ferric sulfate leach liquor to bring about dissolution of the copper contained in the mineral particles. The leach process produces a pregnant leach solution (PLS) which is then treated by a solvent extraction (SX) process to separate and recover the dissolved copper. The SX process is followed by electrowinning to produce high-purity copper cathodes.

In some prior art leach processes (see, for example, U.S. Pat. No. 5,993,635), a flotation concentrate is initially subjected to ultra-fine grinding, followed directly by oxidative leaching under atmospheric conditions. In these methods, the copper is dissolved from the copper-bearing minerals at temperatures below the boiling point of water. Although there may be localized, transient heating to temperatures of 100° C. or slightly higher, due to exothermic chemical reactions, the pulp temperature is for the most part limited due to the fact that the system is at atmospheric pressure.

An oxidizing agent, such as ferric ion is commonly used to facilitate the copper dissolution reaction from copper bearing sulfide minerals. During the course of this chemical reaction, the oxidizing agent (i.e., ferric ion) is reduced from the ferric oxidation state to the ferrous oxidation state. To continue the process until the majority of the copper is recovered from the mineral particles, oxygen or air is sparged into the stirred reactor to continuously oxidize the generated ferrous ion back to its +3 oxidation state. In the case of chalcopyrite dissolution, ferric ions are believed to promote the leaching of copper via the following stoichiometry:

$$CuFeS_2 + 4Fe^{3+} = Cu^{2+} + 5Fe^{2+} + 2S°$$

Simultaneous regeneration of the ferric oxidant and maintenance of electro-neutrality is believed to proceed via the following reaction:

$$4Fe^{2+} + O_2 + 4H^+ = 4Fe^{3+} + 2H_2O$$

Consequently, acid is consumed during the electrochemical leaching of chalcopyrite. Similar reactions in which ferric ion acts as an oxidant are known for the leaching of a variety of metal sulfides, including copper, zinc, iron, manganese, nickel, cobalt, etc.

During the course of the atmospheric leach process, crystalline, elemental sulfur (S°) is produced as a reaction product by virtue of the temperatures and oxygen pressures employed. Because the temperatures involved are below the melt temperature of elemental sulfur, the sulfur appears predominantly as a crystalline phase on the surface of the copper-bearing mineral particles being leached.

During the initial stages of the leach process, the surfaces of the copper-bearing mineral particles are amphiphilic due to the presence of hydrophobic sulfur and residual flotation reagents. As the leach process progresses, the accumulation of elemental sulfur causes the copper-bearing particles to become progressively more hydrophobic. During the early stages of the leach process, the combination of fine particle size and the amphiphilic nature of the particle surfaces leads to the formation of a stable froth. During the later stages of the leach process, the accumulated elemental sulfur on these particles can act as a physical barrier, and simultaneously promotes particle-particle agglomeration, thereby inhibiting (i.e., passivates) continued copper dissolution from the mineral particles.

BRIEF DESCRIPTION OF THE DRAWINGS

To complement the description which is being made, and for the purpose of aiding to better understand the features of the invention, a set of drawings illustrating a non-limiting preferred embodiment of a new composition of matter is attached to the present specification as an integral part thereof, in which the following has been depicted with an illustrative and non-limiting character.

In the following, the invention will be described in more detail with reference to drawings in conjunction with exemplary embodiments.

SUMMARY OF THE INVENTION

A method of improving leach kinetics or metal recovery from a metal sulfide is disclosed. In some embodiments, the method comprises an activation step wherein iron in the metal sulfide is exchanged for copper according to the following reaction stoichiometry:

wherein "a" is substantially equal to one, "b" is substantially equal to one, "c" is substantially equal to two, and "x" is substantially equal to or less than 0.10.

An activated metal sulfide product may be formed from the metal sulfide during the activation step. An extent of conversion of the metal sulfide to the activated metal sulfide product may be calculated by the ratio (x/a). According to some preferred embodiment, the metal sulfide comprises chalcopyrite, wherein "c" is substantially equal to two times "a" (2a) and "c" is substantially equal to two times "b" (2b).

The activation step may comprise a metathesis reaction wherein the molar ratio of iron released per mole of copper adsorbed is equal to or greater than one (i.e., is not unity). In instances where the metal sulfide comprises chalcopyrite, the molar amount of iron released from the chalcopyrite (during the exchange of copper for iron) may exceed the molar amount of copper absorbed by the chalcopyrite. The activation step may comprise maintaining charge neutrality by producing an anion to balance the ("w") amount of released iron, wherein the anion is produced by oxidizing sulfide atoms within a lattice of the metal sulfide. The activated metal sulfide product may be deficient in sulfide as well as iron, and may differ in unit cell structure from chalcopyrite and covellite. For example, the activated product may comprise an intermediate phase which is transitionary between chalcopyrite and covellite.

In some embodiments, the method may comprise oxidatively leaching the activated metal sulfide product (i.e., the activated product formed from the metal sulfide during the activation step) at atmospheric pressure. In some embodiments, oxidative leaching of the activated product may occur at a pressure above atmospheric pressure, without limitation.

Also disclosed, is a method of activating a material containing chalcopyrite, comprising the step of treating the material with copper sulfate (e.g., under reducing conditions). Preferably, the step of treating the material with copper sulfate is operable for at least partially converting a portion of the material to a non-stoichiometric, iron-depleted copper sulfide specie (i.e., a non-stoichiometric, iron-depleted copper sulfide "material") according to the following reaction stoichiometry:

wherein "n+3" is the total number of unit cells within a chalcopyrite particle, and wherein "•" denotes an electron hole.

The step of treating the material containing chalcopyrite with copper sulfate (e.g., under reducing conditions) may be performed in the presence of chloride, or it may be performed in the absence of chloride, without limitation. The step of treating the material containing chalcopyrite with copper sulfate (e.g., under reducing conditions) may comprise a diffusion-controlled, solid-state reaction process.

A new composition of matter may be formed according to any of the methods described herein, including those aforementioned methods. The composition of matter may comprise a non-stoichiometric, iron-depleted copper sulfide material which exhibits higher electrochemical reactivity than chalcopyrite. An activated chalcopyrite product may be prepared by one of the methods described herein. For example, an activated chalcopyrite product may be prepared by contacting a surface of a chalcopyrite-containing particle with a cupric solution having a pH greater than about 1.8, under (a) reducing conditions, (b) temperature, and (c) time, all of which are sufficient to convert at least a portion of chalcopyrite present at the surface to another copper-containing mineral phase. For example, the pH may be greater than about 1.9, or may be greater than about 2.0, without limitation.

The other copper-containing mineral phase may comprise a hybrid covellite-chalcopyrite material comprising point defects and lattice strain within its crystal lattice structure. In some embodiments, the other copper-containing mineral phase may comprise a non-stoichiometric, iron-depleted copper sulfide material. In some embodiments, the other copper-containing mineral phase may be metastable. In some embodiments, the other copper-containing mineral phase may be transitory. In some embodiments, the other copper-containing mineral phase may be an intermediate phase which is transitionary between chalcopyrite and covellite.

Preferably, less than about 10.0 mol % of the chalcopyrite in the chalcopyrite-containing particle is converted to said other copper-containing mineral phase. For example, less than about 5.0 mol % of the chalcopyrite in the chalcopyrite-containing particle may be converted to said other copper-containing mineral phase. Alternatively, less than about 3.0 mol % of the chalcopyrite in the chalcopyrite-containing particle may be converted to said other copper-containing mineral phase. Alternatively, less than about 2.0 mol % of the chalcopyrite in the chalcopyrite-containing particle may be converted to said other copper-containing mineral phase. Alternatively, less than about 1.0 mol % of the chalcopyrite in the chalcopyrite-containing particle may be converted to said another copper-containing mineral phase. Alternatively, less than about 0.5 mol % of the chalcopyrite in the chalcopyrite-containing particle may be converted to said other copper-containing mineral phase. Alternatively, less than about 0.1 mol % of the chalcopyrite in the chalcopyrite-containing particle may be converted to said other copper-containing mineral phase. In some non-limiting embodiments, the portion of the chalcopyrite-containing particle converted to said other copper-containing mineral phase may comprise an outer nano-scale layer portion.

According to some embodiments, a method of activating a material containing chalcopyrite may comprise the step of treating a chalcopyrite-containing material under reducing conditions to at least partially convert a portion of the chalcopyrite-containing material to a new material according to the following reaction:

$$(CuFeS_2)_n \bullet \{Cu^+Fe^{3+}(S^{2-})_2\} + 3Cu^{2+} = 3Fe^{2+} + (CuFeS_2)_n \bullet 2\{(Cu^+)_3(S_2^{2-})(S^{\bullet-})\}$$

wherein "n+3" is the total number of unit cells within a chalcopyrite particle, and wherein "•" denotes an electron hole. The method may further comprise the step of oxidatively leaching the treated chalcopyrite-containing material (i.e., oxidatively leaching the new material). The treated chalcopyrite-containing material may comprise a non-stoichiometric, iron-depleted copper sulfide material. For example, the new material may comprise a non-stoichiometric, iron-depleted copper sulfide material.

In some embodiments, the new material may be metastable. In some embodiments, the new material may be transitory. In some embodiments, the new material may comprise an intermediate phase that is transitionary between chalcopyrite and covellite, without limitation.

A metal sulfide leaching circuit according to the teachings disclosed herein may comprise: (a) an activation stage configured to support a metathesis reaction wherein iron in the metal sulfide is exchanged for copper to form an activated metal sulfide material; (b) a first oxidative leach stage preceding the activation stage which is configured to produce (i) the heat needed for the metathesis reaction and (ii) the copper used to drive the metathesis reaction; and, (c) a second oxidative leach stage, following the activation stage, for oxidative dissolution of the activated metal sulfide material. The metal sulfide may comprise chalcopyrite. A portion of the metal sulfide may also comprise a secondary copper bearing mineral, for example, a secondary copper bearing mineral such as covellite, chalcocite, bornite, a copper oxide, a copper carbonate, a copper silicate, or a combination thereof, without limitation.

In some preferred embodiments, less than about 10 mol % of the activated metal sulfide material may comprise a product phase which is deficient in sulfide as well as iron, and may differ in unit cell structure from chalcopyrite and covellite (e.g., may differ in atomic arrangement and/or bond lengths from chalcopyrite and covellite). For example, less than 5 mol % of the activated metal sulfide material may comprise a product phase which is deficient in sulfide as well as iron, and differs in unit cell structure from chalcopyrite and covellite. Alternatively, less than 4 mol % of the activated metal sulfide material may comprise a product phase which is deficient in sulfide as well as iron, and differs in unit cell structure from chalcopyrite and covellite. Alternatively, less than 3 mol % of the activated metal sulfide material may comprise a product phase which is deficient in sulfide as well as iron, and differs in unit cell structure from chalcopyrite and covellite. Alternatively, less than 2 mol % of the activated metal sulfide material may comprise a product phase which is deficient in sulfide as well as iron, and differs in unit cell structure from chalcopyrite and covellite. Alternatively, less than 1 mol % of the activated metal sulfide material may comprise a product phase which is deficient in sulfide as well as iron, and differs in unit cell structure from chalcopyrite and covellite. Alternatively, less than 0.5 mol % of the activated metal sulfide material may comprise a product phase which is deficient in sulfide as well as iron, and differs in unit cell structure from chalcopyrite and covellite.

DETAILED DESCRIPTION OF THE INVENTION

The following description of the non-limiting embodiments shown in the drawings is merely exemplary in nature and is in no way intended to limit the inventions disclosed herein, their applications, or uses.

According to some embodiments, a new leach process (e.g., FLSmidth® Rapid Oxidation Leach (ROL) process) may comprise a first aspect. The first aspect may comprise a new method for treating chalcopyrite and chalcopyrite-containing materials. Accordingly, a first aspect of the FLSmidth® Rapid Oxidation Leach (ROL) process is discussed below.

The atmospheric leaching of chalcopyrite concentrates using acidic ferric sulfate lixiviants is well known to suffer from slow leach kinetics and poor copper recoveries. A number of alternative approaches have been proposed for improving leach kinetics and recoveries. Many of these, while effective, suffer from either high CAPEX or OPEX. As many mine sites begin transitioning from heap leaching of copper oxides to processing of primary sulfides, new cost-efficient leach processes that are compatible with existing SX/EW processes will be needed to maintain existing cathode production. One approach that appears to be highly effective at increasing copper recoveries takes advantage of the enhanced reactivity of transitory, crystal defect structures generated during particle fracture. Significant process efficiencies are gained by matching the rate of grinding to the rate of electrochemical leaching.

The FLSmidth® Rapid Oxidation Leach (ROL) process uses a Stirred Media Reactor (SMRt reactor) with a specific energy of approximately 20-30 kW m$^{-3}$ to achieve copper recoveries of 97+% in 6 hours or less. This approach overcomes many of the surface passivation problems that have hindered other atmospheric leach processes.

According to some embodiments, a new leach process (e.g., FLSmidth® Rapid Oxidation Leach (ROL) process) may comprise a second aspect. The second aspect may comprise a new chemical activation process. Accordingly, a second aspect of the FLSmidth® Rapid Oxidation Leach (ROL) process is discussed below.

The majority of efforts to improve primary copper sulfide leaching have focused on solution chemistry, temperature, $O_2$ pressure, use of catalysts, etc. Historically, very few studies have focused on the solid/solution interface. A new approach to catalyzed, sulfide leaching enables manipulation of the 2-D and 3-D semi-conductor properties of chalcopyrite. Additionally, the generation of point defects within the activated chalcopyrite particles further enhances the electrochemical dissolution rate and recovery of copper from chalcopyrite. Copper dissolution rates are still further accelerated by incorporating a Stirred Media Reactor (SMRt) into the process. By using minute amounts of $Cu^{2+}$ to "pre-activate" chalcopyrite, leach times have been reduced from >20 hours with incomplete Cu dissolution to <2 hours with 98+% Cu dissolution at 75-80° C. Instead of the more typical slow and parabolic leach kinetics for chalcopyrite, pseudo-zero order leach kinetics have been observed in acidic ferric sulfate lixivants as a result of pre-activation.

The activation process takes approximately 15 to 120 minutes to complete at temperatures of 80° C. and is compatible with existing SX/EW processes. The activation time approximately doubles as the temperature is lowered from 80° C. to 70° C. The activation reaction rates are virtually non-existent at temperatures of approximately 50-60° C. and lower.

A method of improving leach kinetics and recovery during atmospheric and/or above-atmospheric leaching of a metal sulfide is disclosed. A system for improving leach kinetics and recovery during atmospheric and/or above-atmospheric leaching of a metal sulfide is also disclosed. New compositions of matter, including nano-composite compositions with enhanced electrochemical reactivity are disclosed. The new compositions may be formed via a reductive pretreatment method disclosed herein and in the aforementioned co-pending applications. The new compositions of matter may be used in systems and/or apparatus disclosed herein and in the aforementioned co-pending applications. The new compositions of matter may exhibit improved electrochemical reactivity, such as improved leach kinetics and/or improved semiconductor/electronic conductor properties, as substantially disclosed and described herein and in the aforementioned co-pending applications.

An activated chalcopyrite product is also disclosed. According to some non-limiting embodiments, the activated chalcopyrite product may be prepared by a method comprising: a metathesis reaction involving contacting a chalcopyrite-containing surface of a chalcopyrite-containing particle with a cupric solution having a pH not less than about 1.8 and not greater than about 7, under reducing conditions, at a temperature and for a period of time sufficient to convert at least a portion of chalcopyrite present at the surface to a non-stoichiometric, metastable, binary copper sulfide phase which is intermediate in composition between chalcopyrite and covellite. According to some non-limiting embodiments, the novel metathesis systems and methods disclosed herein, much less than full conversion is required, and as little less than 5% conversion of chalcopyrite to a metastable, non-stoichiometric binary copper sulfide phase is required for favorable copper recovery during oxidative dissolution.

According to some non-limiting embodiments, the primary metal sulfide (e.g., chalcopyrite) is treated reductively to only partially convert a small amount of chalcopyrite to a chemically activated, non-stoichiometric metal bisulfide product that is intermediate between chalcopyrite and covellite, wherein iron is exchanged by copper as illustrated by the following reaction stoichiometry:

$$Cu_aFe_bS_c + xCu^{2+} \rightarrow Cu_{a+x}Fe_{b-(x+w)}S_{c-w} + (x+w)Fe^{2+}$$

For chalcopyrite, c is equal to 2a and 2b. The fractional extent of conversion to the activated product is calculated as (x/a). Experimental data indicate that the molar ratio of copper sulfate to iron released is not restricted to unity, as in prior art metathesis processes. Instead, the moles of iron released from chalcopyrite can exceed the moles of copper absorbed. While not wishing to be held to any particular theory, the inventors realize that maintaining charge neutrality would require production of an anion to balance the additional iron ("w" in the equation above). This may be accomplished through oxidation of the sulfide atoms within the chalcopyrite lattice. The product phase would then be deficient in sulfide as well as iron, and would differ in both atomic arrangement and bond lengths from chalcopyrite and covellite. TEM analysis by electron diffraction measurements of the product phase, indeed, indicates the phase is intermediate between chalcopyrite and covellite.

According to some non-limiting embodiments, not more than about 4% of the chalcopyrite in the chalcopyrite-containing particle may be converted to said another mineral phase to form the activated chalcopyrite product. According to some non-limiting embodiments, not more than about 2% of the chalcopyrite in the chalcopyrite-containing particle may be converted to said another mineral phase to form the activated chalcopyrite product. According to some non-limiting embodiments, not more than about 1% of the chalcopyrite in the chalcopyrite-containing particle may be converted to said another mineral phase to form the activated chalcopyrite product. In some embodiments, the portion of the chalcopyrite-containing particle converted to an activated mineral phase may comprise an outer, nano-scale layer portion comprising a specie that is a metastable, non-stoichiometric binary copper sulfide.

According to some non-limiting embodiments, the source of the copper sulfate for carrying out the activation may be recycled raffinate, or obtained by dissolving reject copper cathodes or a combination thereof. Rejected copper cathodes that fail to meet quality specifications may be leached using sulfuric acid to produce solid copper sulfate.

According to some non-limiting embodiments, the activated chalcopyrite product, once formed, may be placed in a continuous stirred tank reactor and leached under oxidative conditions. According to some non-limiting embodiments, the activated chalcopyrite product, once formed, may be placed in a continuous stirred tank reactor coupled to with a stirred media reactor.

A method of activating a material containing chalcopyrite through a diffusion-controlled, solid-state reaction process, so as to create a new composition having greater electrochemical reactivity, is further disclosed. The method may comprise the step of: in a first stage, treating a chalcopyrite-containing material with copper sulfate under reducing conditions, either in the presence or absence of chloride to at least partially convert a portion of the chalcopyrite-containing material to a non-stoichiometric, iron depleted copper sulfide specie according to the following reaction stoichiometry:

$$(CuFeS_2)_n \cdot 3\{Cu^+Fe^{3+}(S^{2-})_2\} + 3Cu^{2+} = 3Fe^{2+} + (CuFeS_2)_n \cdot 2\{(Cu^+)_3(S_2^{2-})(S^{\cdot-})\}$$

Figure 1:
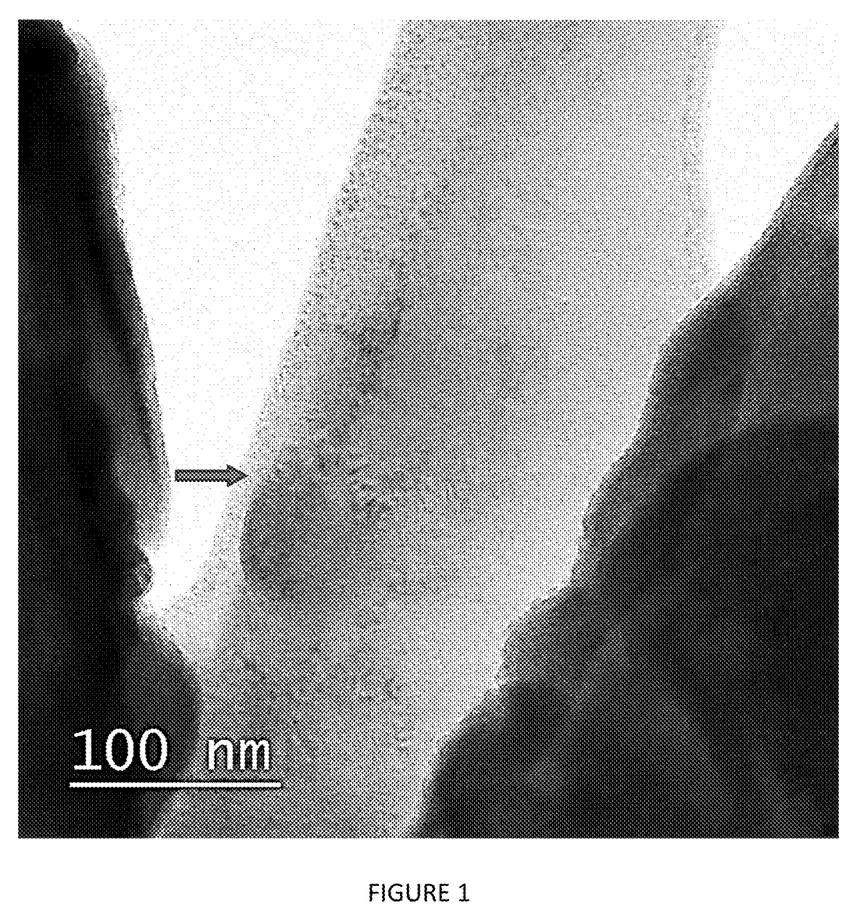
FIG. 1 shows a TEM image of a new nano-composite composition containing species of chalcopyrite and a non-stoichiometric, iron-depleted copper sulfide. The new nano-composite composition may be formed through the reductive pretreatment of particles containing chalcopyrite. The new nano-composite composition may be leached (e.g., under oxidative conditions) or may have further applicability within the semi-conductor arts.
Figure 2:
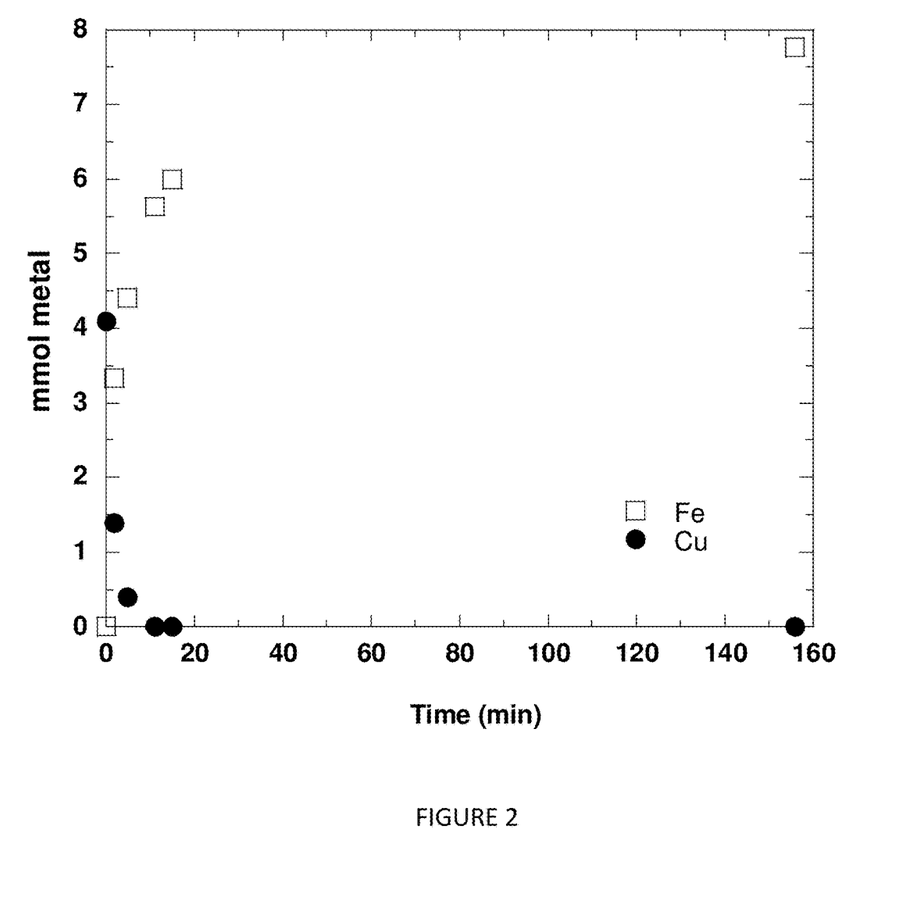
FIG. 2 shows the evolution of dissolved copper and iron over time during the activation of chalcopyrite. While the copper uptake is very fast, the iron release from the solids continues even after all the copper has been absorbed. Contrary to prior art teachings (wherein the exchange of iron by copper during the Cu metathesis of chalcopyrite occurs at a 1:1 molar ratio), the amount of iron released in the present invention is greater than the amount of copper absorbed. This indicates that a non-stoichiometric, iron-depleted, copper rich phase forms. Furthermore, the continued release of iron is an indication of lattice rearrangement within an activated energy state.
Figure 3:
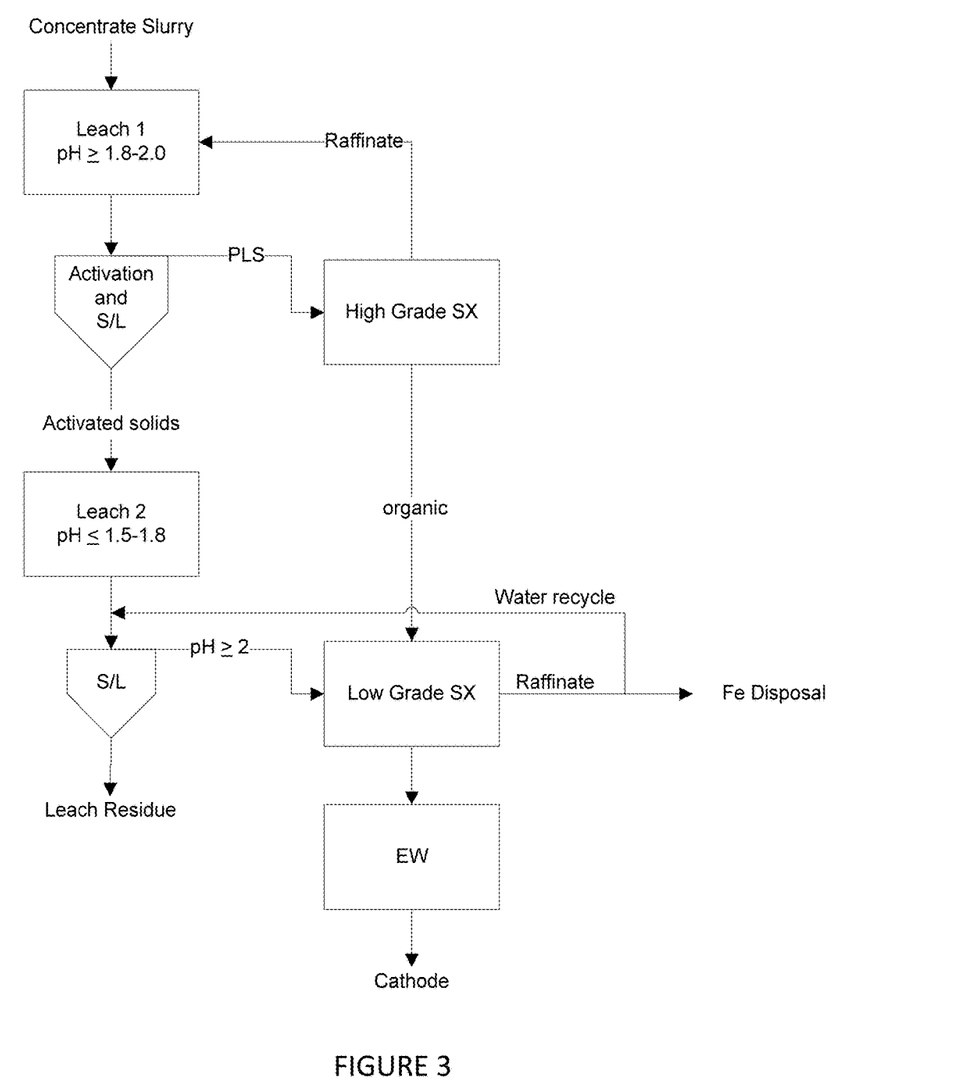
FIG. 3 shows a process flow diagram illustrating an aspect of the invention in which the copper for the activation reaction is generated by a first oxidative leach stage. By allowing the pH to rise above a pH of approximately 1.8, the system becomes preg-robbing with respect to dissolved $Cu^{2+}$ thereby enabling the activation of any unleached $CuFeS_2$ particles to take place during the solid/liquid separation operation. The activated $CuFeS_2$ particles are then oxidatively leached to completion in a subsequent leach stage.
Figure 4:
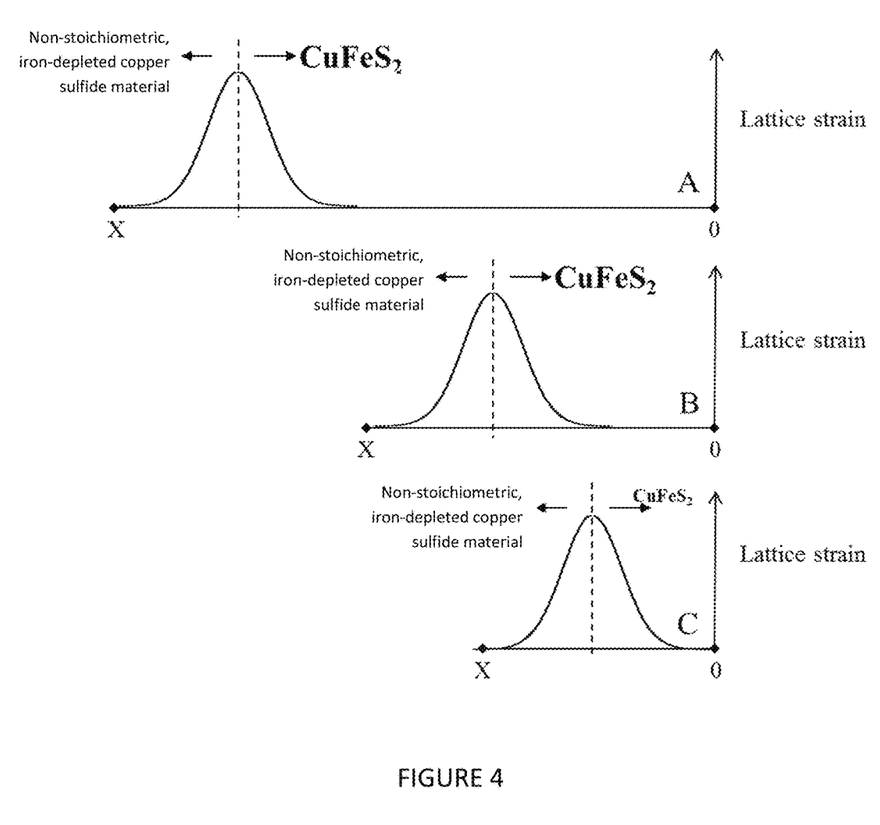
FIG. 4 is a schematic drawing illustrating the effect of particle size on the activation of chalcopyrite via Cu metathesis, wherein the x-axis represents the distance with the particle center at 0. As shown, the diffusion front may introduce lattice strain and/or point defects.

The copper sulfate used in the activation of chalcopyrite may be recycled raffinate, dissolved copper derived from reject copper cathodes or a combination thereof. According to some non-limiting embodiments, the method may further comprise the step of oxidatively leaching the new composition, for example, in a second stage. Alternatively, the copper for the activation may be produced in situ during a first oxidative leach stage, which is followed by an activation stage (in which a metathesis reaction takes place), and then ultimately followed by a second final oxidative leach stage after the activation stage. This approach has the advantage of using the heat generated during the oxidative leaching in the first oxidative leach stage to drive the following activation stage, prior to the second final oxidative leach stage. This approach is enabled by controlling the pH and Eh of the intermediate slurry as illustrated in FIG. 3. Some non-limiting, non-exhaustive advantages of the embodiment shown in FIG. 3 may include: (1) a minimal need for separately heating components involved in the activation step, (2) copper required for activation may be provided directly from the leach, (3) leaching may be performed with lower initial acid, thereby reducing acid costs, and/or (4) means for transferring ferric ion to a second stage leach by precipitation on the solids is provided. According to some non-limiting embodiments, the new composition made by the aforementioned method and stoichiometry may exhibit impressive leach kinetics and may have utility within the semi-conductor arts, for example, within photovoltaic materials.

It should be known that the particular features, processes, and benefits which are shown and described herein in detail are purely exemplary in nature and should not limit the scope of the invention. For example, the specific gravity of grinding media may vary, and the rate of attrition grinding within a stirred media reactor device according to certain embodiments of the invention disclosed may be controlled, so as to match chemical reaction rates and control redox potentials to obtain pseudo zero-order leach kinetics.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions herein are proffered by way of example to facilitate comprehension of the invention and should not be construed to limit the scope thereof.

We claim:

1. A method of improving leach kinetics or metal recovery from a metal sulfide comprising:
exchanging iron in the metal sulfide for copper according to the following reaction stoichiometry:

$$Cu_aFe_bS_c + xCu^{2+} \, Cu_{a+x}Fe_{b-(x+w)}S_{c-w} + (x+w)Fe^{2+}$$

wherein a is equal to one, b is equal to one, c is equal to two, x is equal to or less than 0.10, and the molar amount of iron (x+w) released from the $Cu_aFe_bS_c$ exceeds the molar amount x of copper absorbed by the $Cu_aFe_bS_c$,
wherein charge neutrality is maintained by producing an anion to balance the w amount of released iron,
wherein a ratio of the molar amount (x+w) of iron released from the $Cu_aFe_bS_c$ to the molar amount x of copper absorbed by the $Cu_aFe_bS_c$ is 1.2 to 1.94.

2. The method according to claim 1, wherein the extent of conversion of the metal sulfide is calculated by the ratio (x/a).

3. The method according to claim 1, wherein the anion is produced by oxidizing sulfide atoms within a lattice of the metal sulfide.

4. The method according to claim 1, wherein the product $Cu_{a+x}Fe_{b-(x+w)}S_{c-w}$ is deficient in sulfide as well as iron, and differs in unit cell structure from chalcopyrite and covellite.

5. The method according to claim 1, wherein the product $Cu_{a+x}Fe_{b-(x+w)}S_{c-w}$ comprises an intermediate phase which is metastable and transitionary between chalcopyrite and covellite.

6. The method according to claim 1, further comprising oxidatively leaching the product $Cu_{a+x}Fe_{b-(x+w)}S_{c-w}$ at atmospheric pressure.

7. The method according to claim 1, further comprising oxidatively leaching the product $Cu_{a+x}Fe_{b-(x+w)}S_{c-w}$ at a pressure above atmospheric pressure.

8. A method of activating a material containing chalcopyrite, comprising treating the material with copper sulfate under reducing conditions, and at least partially converting a portion of the material to a non-stoichiometric, iron-depleted copper sulfide specie according to the following reaction stoichiometry:

$$(CuFeS_2)_n \cdot 3\{Cu^+Fe^{3+}(S^{2-})_2\} + 3Cu^{2+} \rightarrow 3Fe^{2+} + (CuFeS_2)_n \cdot 2\{(Cu^+)_3(S_2^{2-})(S^{\cdot-})\}$$

wherein n+3 is the total number of unit cells of $(CuFeS_2)_n \cdot 3\{Cu^+Fe^{3+}(S^{2-})_2\}$ within a particle of the material;
wherein n is the number of unit cells of $CuFeS_2$ contained within $(CuFeS_2)_n \cdot 3\{Cu^+Fe^{3+}(S^{2-})_2\}$ which remain unreacted by the copper sulfate, and
wherein superscript $\cdot$ appearing after S denotes an electron hole.

9. The method according to claim 8, wherein treating the material with copper sulfate under reducing conditions is performed in the presence of chloride.

10. The method according to claim 8, wherein treating the material with copper sulfate under reducing conditions is performed in the absence of chloride.

11. The method according to claim 8, wherein treating the material with copper sulfate under reducing conditions comprises a diffusion-controlled, solid-state reaction process.

12. A composition of matter formed via the method according to claim 1, comprising a non-stoichiometric, iron-depleted copper sulfide material which exhibits higher electrochemical reactivity than chalcopyrite.

13. A method of chemically activating a material containing chalcopyrite comprising the step of:
treating the material with cupric solution under reducing conditions to at least partially convert a portion of the material to a new material according to the following reaction:

$$(CuFeS_2)_n \cdot 3\{Cu^+Fe^{3+}(S^{2-})_2\} + 3Cu^{2+} \rightarrow 3Fe^{2+} + (CuFeS_2)_n \cdot 2\{(Cu^+)_3(S_2^{2-})(S^{\cdot-})\}$$

wherein n+3 is the total number of unit cells of $(CuFeS_2)_n \cdot 3\{Cu^+Fe^{3+}(S^{2-})_2\}$ within a particle of the material;
wherein n is the number of unit cells of $CuFeS_2$ contained within $(CuFeS_2)_n \cdot 3\{Cu^+Fe^{3+}(S^{2-})_2\}$ which remain unreacted by the cupric solution, and
wherein superscript • appearing after S denotes an electron hole.

14. The method of claim 13, further comprising the step of oxidatively leaching the treated chalcopyrite-containing material.

15. The method according to claim 13, wherein the treated chalcopyrite-containing material comprises a non-stoichiometric, iron-depleted copper sulfide material.

16. The method according to claim 13, wherein the new material comprises a non-stoichiometric, iron-depleted copper sulfide material.

17. The method according to claim 13, wherein the new material is metastable.

18. The method according to claim 17, wherein the new material is transitory.

19. The method according to claim 17, wherein the new material is an intermediate phase that is transitionary between chalcopyrite and covellite.

20. A composition of matter formed via the method according to claim 8, comprising a non-stoichiometric, iron-depleted copper sulfide material which exhibits higher electrochemical reactivity than chalcopyrite.

* * * * *